US007123201B2

(12) United States Patent
Caudle

(10) Patent No.: US 7,123,201 B2
(45) Date of Patent: Oct. 17, 2006

(54) RADAR ANTENNA LEVELING SYSTEM

(76) Inventor: Patrick Caudle, 926 Bass Ave., Port Isabel, TX (US) 78578

( * ) Notice: Subject to any disclaimer, the term of this patent is extended or adjusted under 35 U.S.C. 154(b) by 0 days.

(21) Appl. No.: 10/906,193

(22) Filed: Feb. 8, 2005

(65) Prior Publication Data

US 2005/0195123 A1 Sep. 8, 2005

Related U.S. Application Data

(60) Provisional application No. 60/549,244, filed on Mar. 2, 2004.

(51) Int. Cl.
*H01Q 1/34* (2006.01)
*G01S 13/00* (2006.01)

(52) U.S. Cl. .................... 343/709; 343/882; 342/26 C

(58) Field of Classification Search ................ 343/709, 343/713, 882, 890, 891, 892
See application file for complete search history.

(56) References Cited

U.S. PATENT DOCUMENTS

| | | | | |
|---|---|---|---|---|
| 4,659,044 | A * | 4/1987 | Armstrong | 248/218.4 |
| 4,694,773 | A * | 9/1987 | Sparkes et al. | 114/354 |
| 5,111,212 | A * | 5/1992 | DeSatnick et al. | 343/709 |
| 5,179,382 | A * | 1/1993 | Decker | 342/8 |
| 5,332,187 | A * | 7/1994 | Voit et al. | 248/659 |
| 5,575,438 | A * | 11/1996 | McGonigle et al. | 244/13 |
| 5,922,039 | A * | 7/1999 | Welch et al. | 701/116 |
| 5,990,846 | A * | 11/1999 | Dichter | 343/872 |
| 6,097,344 | A * | 8/2000 | Anderson | 343/709 |
| 6,230,647 | B1 * | 5/2001 | Donoian | 114/343 |
| 6,269,763 | B1 * | 8/2001 | Woodland | 114/382 |
| 6,445,353 | B1 * | 9/2002 | Weinbrenner | 343/763 |
| 2003/0160731 | A1 * | 8/2003 | Wensink | 343/892 |

* cited by examiner

*Primary Examiner*—Don Wong
*Assistant Examiner*—Marie Antoinette Cabucos
(74) *Attorney, Agent, or Firm*—Law Office of Tim Cook P.C.

(57) ABSTRACT

A remotely controllable, tiltable platform supports a radar transmitter/receiver for rotational movement of the radar relative to a mounting on a vessel, such as a mast of a sailboat or the superstructure of a power boat. A cowling extends upward from the foundation plate and a stationary hinge plate, parallel to the foundation plate, is secured to the top of the cowling. A top antenna mounting plate is hingedly secured to the stationary hinge plate. An actuator is positioned within the cowling to controlled movement of the top antenna mounting plate to maintain the radar level with the horizon. Alternatively, an A-frame structure mounts the leveling system to a mast of a sailboat.

4 Claims, 5 Drawing Sheets

RADAR ANTENNA LEVELING SYSTEM

This application claims the benefit of U.S. Provisional Patent Application Ser. No. 60/549,244 filed Mar. 2, 2004.

FIELD OF THE INVENTION

The present invention relates generally to the field of radar systems mounted on vessels and the like, and, more particularly, to a system for leveling a vessel mounted radar from a position remote from the radar.

BACKGROUND OF THE INVENTION

Radar systems are commonly in use on vessels today throughout the world. Such systems are used on all manner of vessels, including powered craft and sailboats, from the largest to the smallest, and in all sorts of waterways. Most radar systems in use today for civilian use have a relatively low power; ocean going vessels of necessity rely on systems having much great power, in order to provide images well beyond the horizon.

The common technique for mounting a radar dish to a vessel is to solidly mount the radar rotating structure within a housing which is firmly affixed to a solid structure of the vessel. In large part, such radar structures are rigidly mounted because the radar systems in use in smaller craft were adapted from radar systems which were developed from large, ocean going vessels. However, a rigid mount on a large vessel works well because the large vessel experiences relatively small degrees of roll, pitch, and yaw. These kinds or motions, however, can play havoc with the image displayed by a radar mounted to a small vessel which routinely changes its aspect in relation to the horizon, such as by pitch, roll, yaw, and natural canting of the vessel due to acceleration and deceleration.

Rigid mounting of a radar on small vessels, whether powered craft or sailboats, has other drawbacks, For example, in order to gain the maximum range for the relatively low power system as previously described, it is desirable to mount the transceiver at the highest point possible on the vessel, and this is most often a mast structure of some kind. For small craft, the top of the mast moves substantially in aspect, orientation, and azimuth as the vessel traverses even relatively calm waters.

A number of structures have been used to try to stabilize the radar transceiver in its movement with the movement of the vessel. Since the radar structure is commonly mounted on a mast, small movement of the vessel in any of the six degrees of movement is amplified at the position of the radar. For example, certain gimbal systems are commonly used to attempt to dampen the rolling of the vessel to help maintain the radar parallel with the surface of the water. Such systems are passive and offer no control by the operator of the vessel. Particularly, such systems offer little in the way of leveling control for one of the common movements of the vessel and that is the rising of the bow and dipping of the stern when the vessel operates at speed, then returns to a more level flight when speed is reduced.

The present invention is directed to solving this need in the art.

SUMMARY OF THE INVENTION

The present invention addresses this need in the art by providing a remotely controllable, tiltable platform on which a radar transmitter may be mounted. Radar systems on small craft are typically provided with a foundation plate and the platform of this invention is adapted to mount onto the available foundation plate. A cowling extends upward from the foundation plate and a stationary hinge plate, parallel to the foundation plate, is secured to the top of the cowling. A top antenna mounting plate is hingedly secured to the stationary hinge plate.

An actuator, preferably hydraulic or electric, is secured to the foundation plate at the bottom of the actuator and to the top antenna mounting plate at the top of the actuator. Power to the actuator is remotely controlled by an operator, preferably at the helm of the vessel. When the vessel is underway at speed, the bow rises, thereby tilting the mast back, for example by 15 degrees or even more. When the vessel has reached a steady cruising speed, the operator powers the actuator, thereby tiling the top antenna mounting plate relative to the stationary hinge plate. A radar transceiver is mounted onto the top antenna mounting plate, and is therefor tilted by the movement of the actuator.

The present invention is also adaptable to use on sailboats, particularly a sailboat that is sailing on a reach. When sailing with the wind substantially abeam, the sailboat will heel away from the wind. When the vessel heels, the mast moves away from the vertical so that the radar mounted on the mast is no longer aligned parallel with the horizon. The tiltable radar of this invention is then actuated, bringing the radar once again into alignment with the horizon, under the control of the operator.

These and other features and advantages of this invention will be readily apparent to those skilled in the art.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

FIG. 7 is a perspective view of the leveling system mounted to a mast of a sailboat or the like.

DETAILED DESCRIPTION OF A PREFERRED EMBODIMENT

Figure 1:
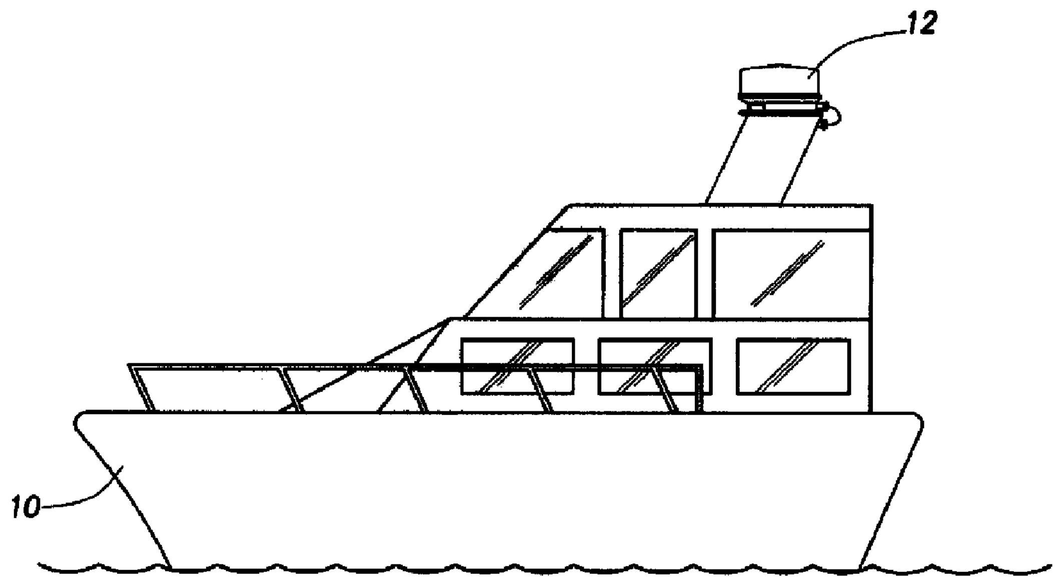
FIG. 1 is a side view of a power boat at a slow speed or at “all stop” with a tiltable radar leveling system of the present invention mounted thereon.
Figure 2:
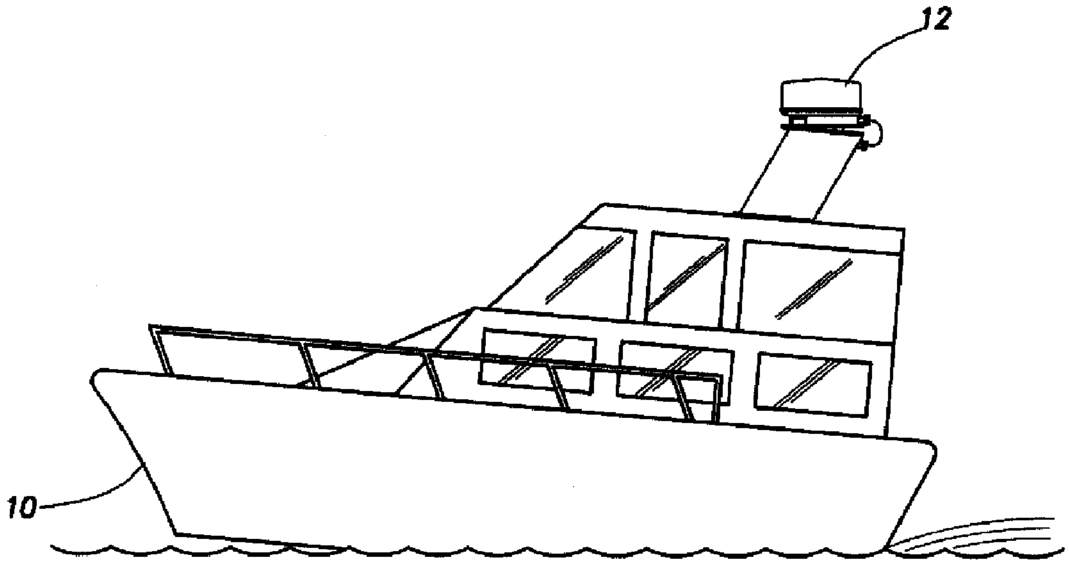
FIG. 2 is a side view of a power boat underway with a tiltable radar leveling system of the present invention mounted thereon.

FIGS. 1 through 4 illustrate the need for the present invention. FIG. 1 shows a power boat 10 at rest. At the highest point practicable on the boat, a radar 12 is mounted. The radar 12 sweeps in a 360 degree pattern, and the transmitted signal is parallel with the horizon around the boat, so long as the boat is substantially level. However, when the boat is underway, as illustrated in FIG. 2, the bow rises and the stern dips, giving the boat a "bow up" aspect. In order to keep the radar sweeping the horizon in a level fashion, the radar is tilted up by the present invention to give the radar dome a level aspect.

Figure 3:
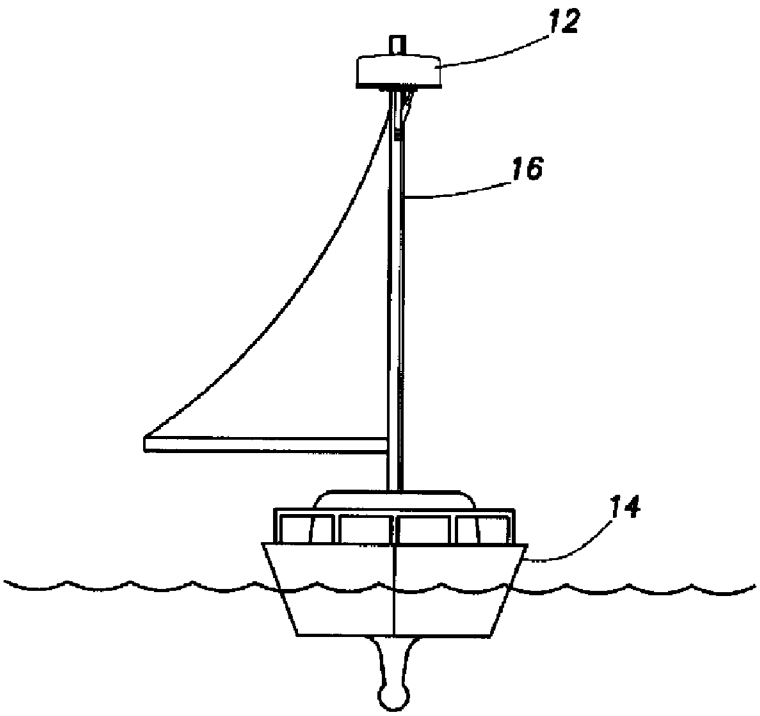
FIG. 3 is a bow view of a sailboat becalmed with a tiltable radar leveling system of the present invention mounted thereon.
Figure 4:
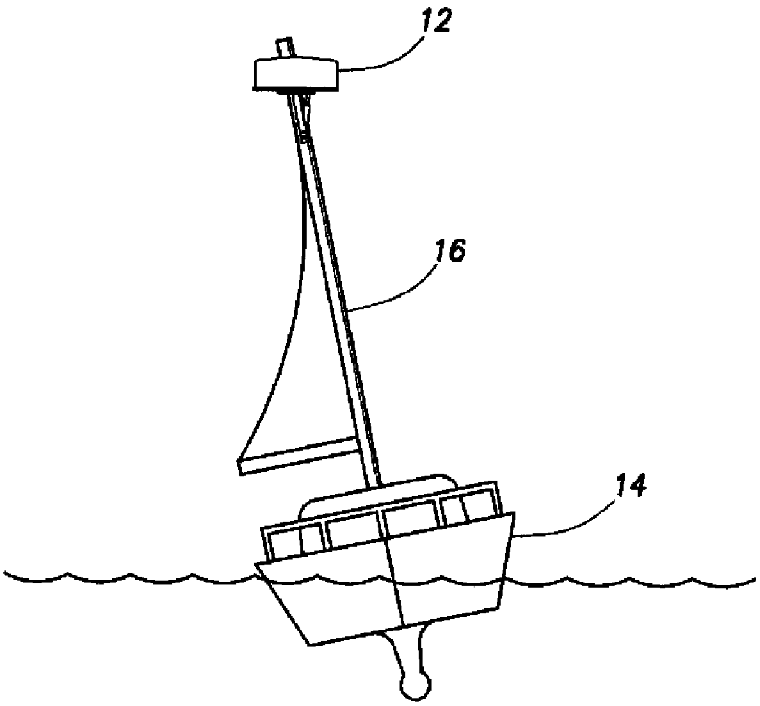
FIG. 4 is a bow view of a sailboat underway at speed with a tiltable radar leveling system of this invention mounted thereon.

A similar benefit for a sailboat 14 is illustrated conceptually in FIGS. 3 and 4. So long as the boat is not heeled (i.e. a mast 16 remains substantially perpendicular), then the radar 12 remains level, sweeping the horizon in a parallel manner. However, when the sailboat is underway under wind power, the boat heels and the mast 16 is no longer perpendicular. This motion skews the radar sweep relative to the horizon and the present invention brings the radar dome back level, as shown in FIG. 4.

Figure 5:
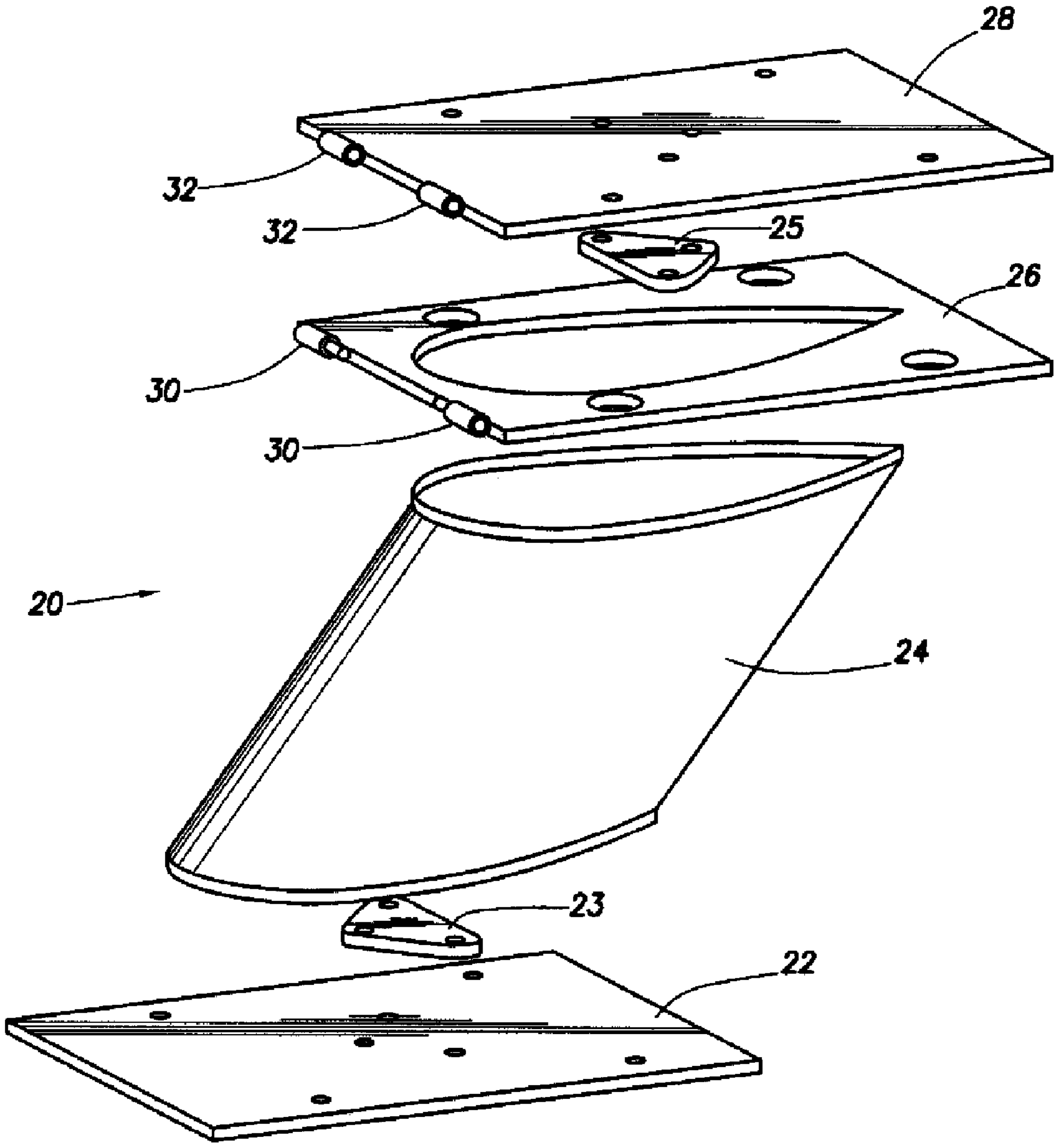
FIG. 5 is an exploded view of the mounting hardware for the leveling system of the present invention.

FIG. 5 depicts an exploded view of the preferred mounting of the radar leveling system of FIGS. 1 and 2, adapted for mounting a radar to a power boat. As previously described, the present invention is directed to a remotely controllable, tiltable platform system 20 on which a radar transmitter may be mounted. Small craft typically have a foundation plate 22 securely mounted to the vessel, for example high on a mast or other elevated portion of the vessel, such as on the flying bridge as shown in FIGS. 1 and 2. A lower actuator mounting plate 23 is secured to the foundation plate, such as for example by bolting the plate 23 to the plate 22.

A cowling 24 extends upward from the foundation plate 22 and a stationary hinge plate 26, parallel to the foundation plate 22, is secured to the top of the cowling 24. A top antenna mounting plate 28 is hingedly secured to the stationary hinge plate 26 by hinge members 30 and 32. An upper actuator mounting plate 25 is secured to the underside of the top antenna mounting plate 28, such as for example by bolting the plate 25 to the plate 28.

Figure 6A:
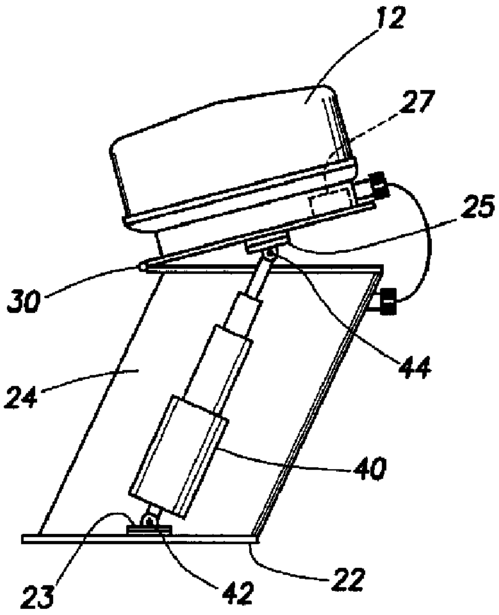
FIG. 6A is a side view illustrating the leveling system with an actuator within a cowling, showing the system tilted.
Figure 6B:
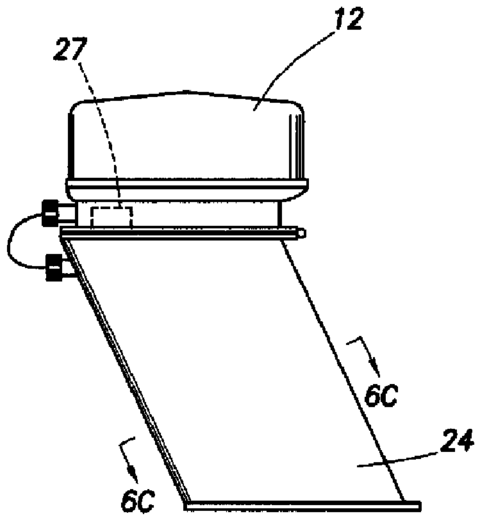
FIG. 6B is a side view illustrating the leveling system with an actuator within a cowling, showing the system in a stowed configuration.

As shown in FIG. 6A, an actuator 40, preferably hydraulic or electric, is secured to the foundation plate 22 at the bottom of the actuator and to the top antenna mounting plate at the top of the actuator both by means of mounting plates 23 and 25, respectively.

Power to the actuator 40 is remotely controlled by an operator, preferably at the helm of the vessel. When the vessel is underway at speed, the bow rises, thereby tilting the cowling 24 back, for example by 15 degrees or even more. The amount of tilt is measured by an inclinometer 27 mounted within the radar transceiver dome. When the vessel has reached a steady cruising speed, the operator powers the actuator, thereby tiling the top antenna mounting plate relative to the stationary hinge plate, as illustrated in FIG. 6A. The radar transceiver dome 12 is mounted onto the top antenna mounting plate, and is therefor tilted by the movement of the actuator.

The actuator 40, is secured to the lower plate 23 with a joint 42 and to the upper plate with a joint 44 for ease of movement. The actuator is enclosed within the cowling 24 to produce a more aerodynamic aspect to the wind and to shield the actuator against the harsh environment in which the boat operates. A power cable 46 couples the radar transceiver dome 12 to the lower elements of the leveling system and power cable 46 also carries the radar data signals.

Figure 6C:
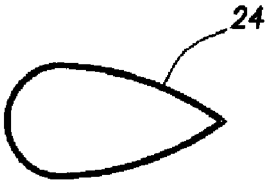
FIG. 6C is section view of the cowling, shown along the section lines C—C of FIG. 6B.

FIG. 6C depicts a cross sectional view of the cowling 24, which is substantially teardrop shaped. This shape advantageously provides an aerodynamic aspect to the cowling.

The present invention is equally applicable to sailboats, as depicted in FIGS. 3 and 4. The radar transceiver dome is preferably mounted on the forward, i.e. leading, edge of the mast 16 in a position to avoid interference from or interfering with the sail of the boat. This aspect of the invention is depicted in detail in FIG. 7.

Figure 7:
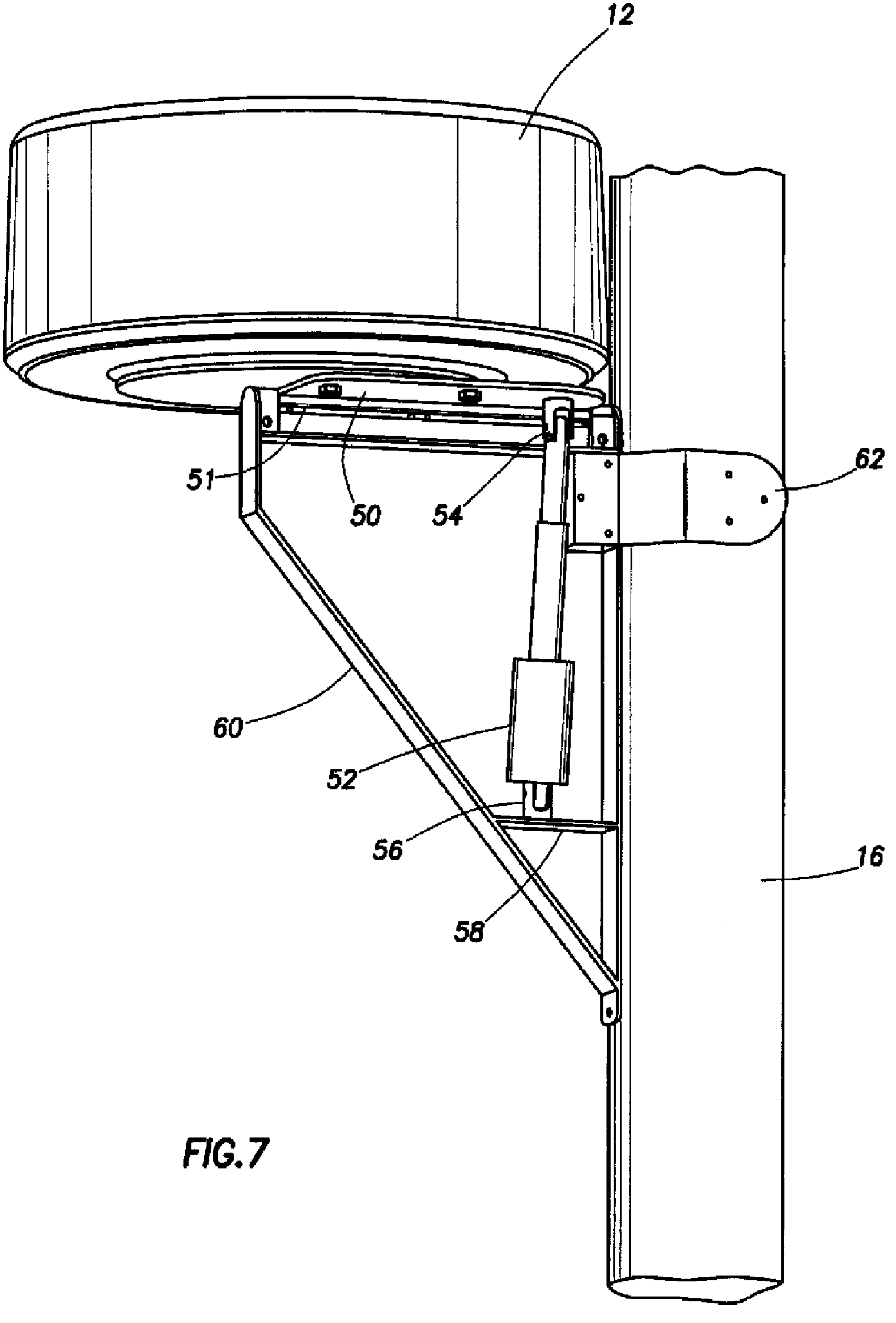

In this embodiment of the invention, the radar transceiver dome is firmly affixed to a mounting plate 50. The mounting plate 50 is raised and lowered by an actuator 52 which is coupled to the mounting plate with an upper universal joint 54. FIG. 7 shows the actuator joined to the mounting plate on the port side of an axle 51 but the actuator may be joined to the starboard side of the axle 51 if desired. A lower universal joint 56 joins the actuator 52 is a cross beam 58 of an A-frame member 60. The A-frame member 60 is mounted to the mast with a bracket 62.

Note that, in the embodiment of FIG. 7, the A-frame, rather than the cowling structure of the previous embodiment, provides a lightweight, open structure. This is because weight is a critical factor when mounting the radar transceiver to the mast. Too much weight, mounted so high on the mast, presents an instability problem.

Figure 8:
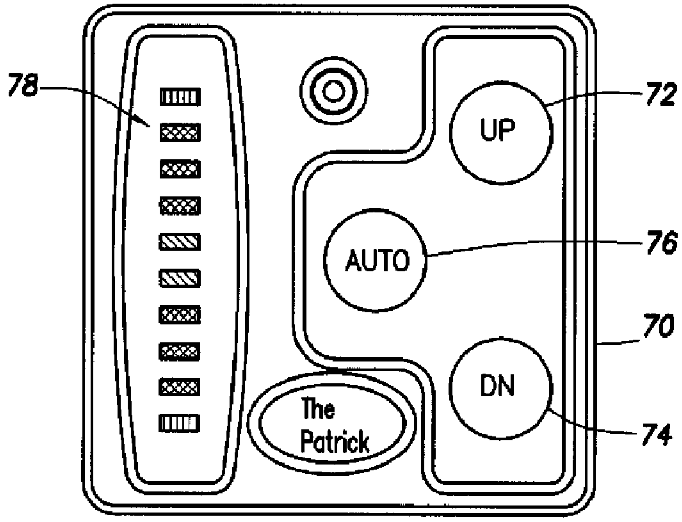
FIG. 8 is a front view of a control panel of this invention.

Finally, as previously described, an inclinometer 27 is provided associated with the dome 12 and moving therewith. FIG. 8 shows a simple, user-friendly control consol 70 provided with the leveling system of this invention. The consol includes an up control button 72 and a down control button 74. If desired, the operator may select an "AUTO" button 76 in which the radar is automatically leveled by the system. In doing so, the system provides a minimum amount of tilt change before actuating the actuator 40 or 52 and dead time before actuation. This feature eliminates hunting in the leveling system. The control panel also includes a plurality of light indicators 78 which indicate when the radar is level, when the radar is high, or when the radar is low, to assist the operator in leveling the radar.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

What is claimed is:

1. A radar antenna leveling system for a vessel comprising:

a tiltable platform system comprising:

- a foundation plate secured to the vessel, the foundation plate having an upper surface;
- a lower actuator mounting plate secured to the upper surface of the foundation plate;
- a stationary hinge plate parallel to the foundation plate, the stationary hinge plate having an under surface;
- a top antenna mounting plate secured hingedly mounted to the stationary hinge plate for rotational movement therewith, the top antenna mounting plate having an under surface;

an upper actuator mounting plate secured to the under surface of the top antenna mounting plate; and a cowling secured to the upper surface of the foundation plate and to the under surface of the stationary hinge plate, the cowling having a hollow interior;

an actuator secured to the lower actuator mounting plate and to the upper actuator mounting plate for rotational movement of the top antenna mounting plate relative to the vessel, wherein the actuator extends through the hollow interior of the cowling; and control remote from the actuator for operation of the actuator.

2. The system of claim 1, further comprising a flexible joint securing the actuator to the lower actuator mounting plate.

3. The system of claim 1, wherein the control includes operator selectable controls to move the top antenna mounting plate up, down, and automatically control the leveling of the system.

4. The system of claim 1, further comprising an inclinometer secured for movement with the top antenna mounting plate.

* * * * *